(12) United States Patent
Terai et al.

(10) Patent No.: US 7,657,181 B2
(45) Date of Patent: Feb. 2, 2010

(54) OPTICAL ADD/DROP MULTIPLEXER AND OPTICAL NETWORK SYSTEM

(75) Inventors: Noboru Terai, Kawasaki (JP); Goji Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 131 days.

(21) Appl. No.: 11/727,841

(22) Filed: Mar. 28, 2007

(65) Prior Publication Data
US 2007/0172240 A1 Jul. 26, 2007

Related U.S. Application Data

(63) Continuation of application No. PCT/JP2005/001909, filed on Feb. 9, 2005.

(30) Foreign Application Priority Data
Sep. 29, 2004 (JP) ............................. 2004-285372

(51) Int. Cl.
*H04J 14/02* (2006.01)
(52) U.S. Cl. .................. 398/83; 398/79; 398/45; 398/48; 398/84; 385/24; 385/37
(58) Field of Classification Search .................. 398/79, 398/82, 83, 84, 85, 87, 45, 48, 50, 56, 59, 398/91; 385/24, 37, 16, 17, 18
See application file for complete search history.

(56) References Cited

U.S. PATENT DOCUMENTS 6,437,888 B1 * 8/2002 Grasso et al. .................. 398/82
6,829,438 B2 * 12/2004 Liu et al. ...................... 398/83
7,292,786 B1 * 11/2007 Barbarossa et al. ............ 398/83
7,308,197 B1 * 12/2007 Zhong et al. .................. 398/48
2006/0013587 A1 * 1/2006 Scott et al. .................... 398/83

FOREIGN PATENT DOCUMENTS

| JP | 11-174389 | 7/1999 |
|----|-----------|--------|
| JP | 11-508428 | 7/1999 |
| JP | 11-289296 | 10/1999 |
| JP | 2001-352313 | 12/2001 |
| JP | 2002-158682 | 5/2002 |
| JP | 2002-527990 | 8/2002 |
| JP | 3401189 | 2/2003 |
| WO | 00/22765 | 4/2000 |

OTHER PUBLICATIONS

Goji Nakagawa et al. "Photonic Gateway for Metro Network using Acousto-Optic Tunable Filter", The Institute of Electronics, Information and Communication Engineers, 2003.
International Search Report of International Published Application PCT/JP2005/001909 (mailed May 24, 2005).
Japanese Office Action issued on May 26, 2009 in corresponding Japanese Patent Application 2006-537629.

* cited by examiner

*Primary Examiner*—Hanh Phan
(74) *Attorney, Agent, or Firm*—Staas & Halsey LLP

(57) ABSTRACT

In an optical add/drop multiplexer dropping and inserting a light of a specific wavelength for a WDM signal light and an optical network system utilizing the same, a wavelength selective switch selects a part of WDM signal lights inputted as lights of drop wavelengths and outputting other lights, and a reject/add filter terminates lights of same wavelengths as add wavelengths among output lights from the wavelength selective switch and multiplexes other lights than the terminated lights and lights of the add wavelengths to be outputted. At this time, the drop wavelengths are made to include all of the add wavelengths.

8 Claims, 14 Drawing Sheets

US 7,657,181 B2

OPTICAL ADD/DROP MULTIPLEXER AND OPTICAL NETWORK SYSTEM

CROSS-REFERENCE TO RELATED APPLICATION

This application is a continuation of International Application PCT/JP2005/01909 filed on Feb. 9, 2005, the contents of which are herein wholly incorporated by reference.

BACKGROUND OF THE INVENTION

1. Field of the Invention

The present invention relates to an optical add/drop multiplexer and an optical network system, and in particular to an optical add/drop multiplexer dropping and inserting (adding) a light of a specific wavelength with respect to a WDM signal light and an optical network system utilizing the same.

2. Description of the Related Art

In recent years, data communication demands have explosively increased mainly for the Internet traffic, so that increasing capacity and range of backbone networks and metro area networks has been required. On the other hand, services for users have been diversified into various kinds, so that realization of an economical network having a high reliability and flexibility has been required.

Specifically, since an optical transmission network forms a core of an infrastructure of an information and telecommunications network, further sophisticating and widening the service areas are desired, so that the development is on a rapid progress oriented to an information-driven society as expected to further advance.

As a main technology of a large-capacity optical transmission system, a WDM (Wavelength Division Multiplexing) technology has been used. The WDM technology is a method by which a plurality of optical wavelengths are transmitted with a single optical fiber by multiplexing lights of different wavelengths.

In a prior art WDM apparatus, an optical add/drop multiplexer for dropping wavelengths (of light) from a WDM transmission line and for multiplexing (inserting) wavelengths into the WDM transmission line by fixed wavelengths was generally a POADM (Passive Optical add/drop multiplexer) or an ROADM (Reconfigurable OADM) capable of variously dropping and adding fixed wavelengths.

However, in order to realize a network having a high reliability and flexibility, as a technology capable of dropping wavelengths and adding wavelengths with variable ones, namely as an optical add/drop multiplexer capable of dynamically changing the wavelengths to be dropped and/or added, DOADM (Dynamic Optical add/drop multiplexer) has been introduced.

As an example of such a DOADM apparatus, there is an optical add/drop multiplexer mainly used for a metro access region (e.g. 100 km ring) using an optical coupler and a wavelength selective filter when dropping arbitrary wavelengths from a WDM transmission line, and using an optical coupler and a reject/add filter when inserting arbitrary wavelength into the WDM transmission line (see e.g. non-patent document 1).

FIG. 12 shows an arrangement of such a prior art optical add/drop multiplexer 900. The optical add/drop multiplexer 900 is composed of an optical branching portion 910 having two optical couplers 911, 912 and a plurality of wavelength selective filters 913_1-913_n, and an optical inserting portion 920 having a reject/add filter 921, an optical coupler 922, and a plurality of inserting wavelength optical lasers 923_1-923_m.

In operation, a WDM signal light 10 inputted to the optical add/drop multiplexer 900 is branched into two by the optical coupler 911 of the optical branching portion 910, to be provided to the optical coupler 912 in a dropping direction and to the reject/add filter 921 in a through direction. While the same wavelengths are multiplexed in each of two lights branched by the optical coupler 911 in this case, the light in the through direction will be referred to as a through wavelength 30 in order to facilitate later descriptions.

The light inputted to the optical coupler 912 is branched to be provided to the wavelength selective filters 913_1-913_n, and a drop wavelength 20 of a wavelength selected by each of the wavelength selective filters 913_1-913_n is outputted from the optical branching portion 910 to the outside of the optical add/drop multiplexer 900.

On the other hand, an add wavelength 40 inputted from the outside of the optical add/drop multiplexer 900 to the optical inserting portion 920 is converted into a predetermined wavelength in each of the inserting wavelength optical lasers 923_1-923_m, and then multiplexed by the optical coupler 922 to be provided to the reject/add filter 921.

Since the add wavelength 40 is included in the WDM signal light 10 or the through wavelength 30 provided from the optical coupler 911 of the optical branching portion 910, this add wavelength 40 is terminated in the reject/add filter 921 where the add wavelength 40 provided by the optical coupler 922 is multiplexed with the through wavelength so that a WDM signal light 50 is outputted.

It is to be noted that in the event of drastic optical power attenuation as a result of power branching by the optical coupler 911, at least one of optical amplifiers 915 and 914 has only to be inserted as shown in FIG. 12.

A general reject/add filter will now be described referring to FIGS. 13A and 13B. FIG. 13A shows a basic arrangement (single stage arrangement) of a reject/add filter. The reject/add filter 1 shown in FIG. 13A has a common port P1, an insert port P2, and a reflect port P3.

FIG. 13B shows an inner structure of the reject/add filter 1 of FIG. 13A. Among the common port P1, the insert port P2, and the reflect port P3, each of which is a terminal portion of the optical fiber F1, there are provided two lenses L1 and L2 sandwiching a multilayer film filter F. It is to be noted that the multilayer film filter F is occasionally called a thin film filter (TFF).

As shown in FIG. 13B, supposing that the multilayer film filter F transmits only the lights of wavelengths $\lambda 1$-$\lambda 4$, when wavelengths $\lambda 1$-$\lambda 40$, for example, are included in a signal light S1 radiated from the common port 1 through the lens L1 to the multilayer film filter F, the wavelengths $\lambda 1$-$\lambda 4$ are passed through the multilayer film filter F and terminated by an optical terminator T1. However, the wavelengths $\lambda 5$-$\lambda 40$ are reflected by the multilayer film filter F and outputted from the reflect port P3.

On the other hand, when lights of the wavelengths $\lambda 1$-$\lambda 4$ are radiated from the insert port P2 through the lens L2 to the multilayer film filter F, they are transmitted unchanged through the multilayer film filter F to be outputted from the reflect port P3.

Therefore, by conforming the wavelengths transmitted through the multilayer film filter F to those of the lights inputted from the insert port P2 (wavelengths $\lambda 1$-$\lambda 4$ for both in the example shown in FIG. 13B), the reject/add filter 1 will acquire both of a function of a wavelength blocker for blocking a part of the wavelengths (wavelengths $\lambda 1$-$\lambda 4$) from among the wavelengths λ1-λ40 inputted from the common port P1 and a function of an optical coupler multiplexing (coupling) the wavelengths λ1-λ4 inputted from the insert port P2 with the wavelengths λ5-λ40 inputted from the common port P1 and reflected by the multilayer film filter F.

It is to be noted that in the reject/add filter 921 shown in FIG. 12, the reject/add filter 1 of the basic arrangement shown in FIG. 13A is connected in 3 stages.

The reason why the reject/add filter 921 in the optical add/drop multiplexer 900 shown in FIG. 12 is arranged in 3 stages will now be described referring to FIGS. 14A and 14B.

FIG. 14A shows an example of three reject/add filters 1_1-1_3 similar to the reject/add filter 1 of the basic arrangement shown in FIGS. 13A and 13B connected to compose a three-staged reject/add filter 921 while as shown in FIG. 14A, the respective insert ports of the reject/add filter 1_1 and 1_2 are provided with optical terminators T1 and T2 so that the light does not enter. Also as shown in FIG. 14A, the common port P1 of the reject/add filter 921 is the common port of the reject/add filter 1_1, and the insert port P2 and the reflect port P3 of same are ports of the reject/add filter 1_3.

In order to avoid occurrence of adverse effects due to interferences and the like between the wavelengths λ1-λ4 inputted from the insert port P2 and the wavelengths λ1-λ4 inputted from the common port P1, interception loss should be less than about 40 dB for the wavelengths λ1-λ4 inputted from the common port P1.

As shown in FIG. 14A, the interception losses of the wavelengths λ1-λ4 at the times of output from the reject/add filter 1_1 of the first stage and the reject/add filter 1_2 of the second stage, are about 23 dB and 31 dB, respectively, so that they are insufficient. Therefore, in order to achieve the interception loss of about 40 dB, it is required to have three-staged arrangement as shown in FIG. 14A. In this case the interception loss of 38 dB can be achieved.

FIG. 14B shows examples of an interception characteristic and a transmission characteristic of a block wavelength λB (wavelengths λ1-λ4 in the example of FIG. 14A) when the reject/add filter 921 is used.

While it is made possible to secure enough interception loss by making the reject/add filter 921 have a three-staged arrangement as described above, the transmission (through) losses of the wavelengths λ5-λ40 increase to the contrary. Namely, the transmission losses assume 0.5 dB for the first stage, 1.0 dB for the second stage, and 1.5 dB for the third stage.

It is to be noted that specific examples of the reject/add filter 1 of the basic arrangement shown in FIGS. 13A and 13B include commercially available products such as "4 Skip 1 Filter" manufactured by Fibernett Co., Ltd.

As another example of an optical add/drop multiplexer, there is one provided with at least two variable wavelength selective filters of a first variable wavelength selective filter for performing a branching and inserting operation for a part of light signals from among light signals to be branched and inserted, and a second variable wavelength selective filter for performing a branching and inserting operation for the light signals to be branched and inserted which were unselected by the first variable wavelength selective filter, thereby branching or inserting all of the light signals to be branched and inserted by using a plurality of the variable wavelength selective filters (see e.g. patent document 1).

In this case, Acousto-Optic Tunable Filters (AOTFs) are used as the first and second variable wavelength selective filters.

Also, there is an optical add/drop multiplexer dropping and inserting light signals without using a multiplexer, a demultiplexer, an optical combiner or a splitter by using a channel selective switch operated in a "bar and cross" state (see e.g. patent document 2).

In this case, optical multiplexed channels are received by the first input of the channel selective switch, channels that are selected so as to be added from the associated line terminal apparatus are received by a second input to be bar-connected to a second output. On the other hand, channels that are selected so as to be dropped are bar-connected from the first input to the first output, while channels not selected so as to be dropped are cross-connected to the second output.

Moreover, there is an optical add/drop multiplexer capable of arbitrarily selecting wavelengths of light signals to be dropped or inserted by using an optical circuit to which arbitrary combination of reflected wavelengths and transmitted wavelengths can be set with an external control (see e.g. patent document 3).

(Non-patent document 1) Goji Nakagawa et al. "Photonic Gateway for Metro Network using Acousto-Optic Tunable Filter" [IEICE Technical report Vol. 103 No. 68 Technical Repot of IEICE CS2003-11, p. 13-17]

(Patent document 1) Japanese Patent Application Laid-open No. 11-289296

(Patent document 2) Japanese Patent Application (Translation of PCT Application) No. 11-508428

(Patent document 3) Japanese Patent No. 3401189

Since the three-staged reject/add filter 921 is required as mentioned above in the optical add/drop multiplexer 900 shown in FIG. 12, the transmission loss of the through wavelength 30 is increased.

Also, considering losses of the through wavelength 30 and the drop wavelength 20 due to the power branching performed by the optical coupler 911 within the optical branching portion 910 and the transmission loss of the drop wavelength in the wavelength selective filters 913_1-913_n in the dropping direction, either one or both of the optical amplifier 914 in the dropping direction and the optical amplifier 915 in the through direction may be required in order to compensate for these losses.

Also, the wavelength selective filters 913_1-913_n are required as much as the number of the drop ports. Since the recent data communication demands trend to increase, the number of drop ports is anticipated to increase inevitably. Namely, the number of the wavelength selective filters 913_1-913_n required for a single optical add/drop multiplexer is on an upward trend, so that increases in cost and size are inevitable.

Due to the above-mentioned use of optical amplifiers 914 and 915 as well as the increase in the number of the wavelength selective filters 913_1-913_n, it is anticipated that the cost of the apparatus per single optical add/drop multiplexer will increase and the apparatus will grow in size.

SUMMARY OF THE INVENTION

It is accordingly an object of the present invention to provide an optical add/drop multiplexer dropping and inserting a light of a specific wavelength for a WDM signal light and an optical network system utilizing the same which can avoid multiple circulation of add wavelengths without increasing optical loss of wavelength light multiplexed with add wavelengths.

Also, it is an object of the present invention to prevent increase in cost and size of the optical add/drop multiplexer.

[1] In order to achieve the above-mentioned object, an optical add/drop multiplexer according to the present invention comprises: a wavelength selective switch selecting a part of WDM signal lights inputted as lights of drop wavelengths and outputting other lights; and a reject/add filter configured in stages of at least one terminating lights of same wavelengths as add wavelengths among output lights from the wavelength selective switch and multiplexing other lights than the terminated lights and lights of the add wavelengths to be outputted; wherein the drop wavelengths include all of the add wavelengths.

Namely, an optical add/drop multiplexer is composed of a wavelength selective switch as an optical branching portion and a single-staged reject/add filter as an optical inserting portion. The wavelength selective switch selects a part of WDM signal lights inputted as lights of drop wavelengths and outputs other lights. On the other hand, the reject/add filter terminates lights of the same wavelengths as add wavelengths among output lights from the wavelength selective switch and multiplexes the other lights and the lights of the add wavelengths to be outputted.

Since the drop wavelengths include all of the add wavelengths, all of the lights of the same wavelength as the add wavelengths included in the WDM signal light inputted on the side of the wavelength selective switch is selected as the drop wavelengths, so that an output light from the wavelength selective switch includes almost no lights of the same wavelength as the add wavelengths.

Therefore, even if the lights of the same wavelengths as the add wavelengths are included in the output light from the wavelength selective switch, the quantity thereof is very small, so that at least a single-staged reject/add filter can sufficiently terminate the add wavelengths.

Conventionally, in order to sufficiently terminate the lights of the same wavelengths as the add wavelengths included in the wavelength light to be multiplexed with the add wavelength, for example, the reject/add filter was required to be made a three-staged arrangement, which led to increase of loss of wavelength light multiplexed with the add wavelength.

However, according to the above-mentioned present invention, the reject/add filter only requires at least one stage, whereby it is made possible to avoid the multiple circulation of the add wavelength without increasing the light loss of the wavelength light multiplexed with the add wavelength.

[2] Also, an optical add/drop multiplexer according to the present invention may comprise: a wavelength selective switch selecting a part of WDM signal lights inputted as lights of drop wavelengths and reject wavelengths and outputting other lights; and a reject/add filter configured in stages of at least one terminating lights of same wavelengths as add wavelengths among output lights from the wavelength selective switch and multiplexing other lights than the terminated lights and lights of the add wavelengths to be outputted; wherein a combination of the drop wavelengths and the reject wavelengths includes all of the add wavelengths.

Namely, the wavelength selective switch selects a part of the inputted WDM light as lights of the drop wavelength and the reject wavelength, and outputs the other lights. On the other hand, the reject/add filter terminates the lights of wavelengths identical with the add wavelength among the output lights from the wavelength selective switch and multiplexes the light other than the wavelengths with the light of the add wavelengths to be outputted.

Since the combination of the drop wavelength and the reject wavelength includes all of the add wavelengths at this time, all of the lights of add wavelengths inputted from the side of the wavelength selective switch are selected as the drop wavelengths or the reject wavelengths, so that almost no lights of the wavelengths identical with the add wavelengths will be included in the output light from the wavelength selective switch.

Therefore, in the same way as in the above-mentioned [1], it is made possible to avoid the multiple circulation of the add wavelengths without increasing the light loss of the wavelength light multiplexed with the add wavelengths.

[3] Also, an optical add/drop multiplexer according to the present invention may comprise: a wavelength selective switch selecting a part of WDM signal lights inputted as lights of drop wavelengths and outputting other lights; and a multiplexer multiplexing output lights from the wavelength selective switch and lights of add wavelengths to be outputted; wherein the drop wavelengths include all of the add wavelengths.

Namely, instead of the reject/add filter in the above-mentioned optical add/drop multiplexer of [1], a multiplexer multiplexes the output lights from the wavelength selective switch and the lights of the add wavelengths to be outputted.

If the drop wavelengths include all of the add wavelengths, the same wavelengths as the add wavelengths included in the WDM signal lights inputted on the side of the wavelength selective switch, so that an output light from the wavelength selective switch includes almost no lights of the same wavelength as the add wavelengths.

Therefore, even by substituting an optical coupler for the reject/add filter, it is made possible to avoid the multiple circulation of the add wavelength without increasing the light loss of the wavelength light multiplexed with the add wavelengths.

[4] Also, an optical add/drop multiplexer according to the present invention may comprise: a wavelength selective switch selecting a part of WDM signal lights inputted as lights of drop wavelengths and reject wavelengths and outputting other lights; and a multiplexer multiplexing output lights from the wavelength selective switch and lights of add wavelengths to be outputted; wherein a combination of the drop wavelengths and the reject wavelengths includes all of the add wavelengths.

Namely, instead of the reject/add filter in the above-mentioned optical add/drop multiplexer of [2], a multiplexer multiplexes the output lights from the wavelength selective switch and the lights of the add wavelengths to be outputted.

Also in this case, since the combination of the drop wavelengths and the reject wavelengths includes all of the add wavelengths, the lights of the add wavelengths included in the WDM signal lights inputted on the side of the wavelength selective switch are all selected as the drop wavelengths or the reject wavelengths, so that an output light from the wavelength selective switch includes almost no lights of the same wavelength as the add wavelengths.

Therefore, in the same way as the above-mentioned [2], it is made possible to avoid the multiple circulation of the add wavelengths without increasing the light loss of the wavelength light multiplexed with the add wavelengths.

[5] Also, an optical add/drop multiplexer according to the present invention may comprise: an optical circulator inputting and outputting WDM signal lights; a wavelength selective switch selecting a part of output lights from one side of the optical circulator as lights of drop wavelengths and reflecting other lights than the selected lights with a reflector to be outputted as lights through another side of the optical circulator; an optical transmissive reflector transmitting and simultaneously reflecting a part of the lights of the drop wavelengths to be outputted through the wavelength selective switch from the optical circulator; and a multiplexer multiplexing output lights from the wavelength selective switch outputted through the optical circulator and lights of add wavelengths to be outputted; wherein the drop wavelengths other than the lights reflected by the optical transmissive reflector include all of the add wavelengths.

Namely, the optical add/drop multiplexer is composed of a combination of an optical circulator, a wavelength selective switch, and an optical transmissive reflector (e.g. half mirror) as an optical branching portion and a coupler as an optical inserting portion.

The optical circulator inputs and outputs the WDM lights, the wavelength selective switch selects a part of output lights from one of the output lights of the optical circulator as drop wavelengths, and reflects the lights other than the selected lights by a reflector to be outputted as another output lights through the optical circulator, the optical transmissive reflector passes through a part of the lights of the drop wavelength and simultaneously reflects the same to be outputted through the wavelength selective switch from the optical circulator.

On the other hand, the multiplexer multiplexes the output light (the other output light) from the wavelength selective switch outputted through the optical circulator and the lights of the add wavelengths to be outputted.

At this time, the output lights from the wavelength selective switch outputted through the optical circulator include lights other than the dropt wavelengths reflected by the reflector and a part of lights of drop wavelengths reflected by the optical transmissive reflector. However, since the drop wavelengths other than the lights reflected by the optical transmissive reflector include all of the add wavelengths, the output lights include almost none of the lights whose wavelengths are the same as the add wavelengths.

Therefore, in the same way as the above-mentioned [3], it is made possible to avoid the multiple circulation of the add wavelengths without increasing the light loss of the wavelength light multiplexed with the add wavelengths. Moreover, it is made possible to not only drop but also pass though the drop wavelengths simultaneously. Accordingly, this is applicable to cases where large-volume data of high quality image and the like are simultaneously transmitted to multiple points.

[6] Also, an optical add/drop multiplexer according to the present invention may comprise: an optical circulator inputting and outputting WDM signal lights; a wavelength selective switch selecting a part of output lights from one side of the optical circulator as lights of drop wavelengths and reject wavelengths, and reflecting other lights than the selected lights with a reflector to be outputted as lights through another side of the optical circulator; an optical transmissive reflector transmitting and simultaneously reflecting a part of the lights of the drop wavelengths to be outputted through the wavelength selective switch from the optical circulator; and a multiplexer multiplexing output lights from the wavelength selective switch outputted through the optical circulator and lights of add wavelengths to be outputted; wherein a combination of the drop wavelengths other than the lights reflected by the optical transmissive reflector and the reject wavelengths includes all of the add wavelengths.

Namely, the optical circulator inputs and outputs the WDM signal lights, the wavelength selective switch selects a part of one of the output lights from the optical circulator as lights of the drop wavelengths and the reject wavelengths while outputting the lights other than the drop wavelengths and the reject wavelengths as another output light after having been reflected by the reflector through the optical circulator, and the optical transmissive reflector passes through a part of the lights of drop wavelengths and simultaneously reflects the same to be outputted through the wavelength selective switch from the optical circulator.

On the other hand, the multiplexer multiplexes the output lights (the other output lights) from the wavelength selective switch outputted through the optical circulator and the lights of the add wavelengths to be outputted.

The output lights from the wavelength selective switch outputted through the optical circulator include lights other than the drop wavelengths reflected by the reflector and a part of lights of drop wavelengths reflected by the optical transmissive reflector. However, since the combination of the drop wavelengths other than the lights reflected by the optical transmissive reflector and the reject wavelengths includes all of the add wavelengths, the output lights include almost none of the lights whose wavelengths are the same as the add wavelengths.

Therefore, in the same way as the above-mentioned [4], it is made possible to avoid the multiple circulation of the add wavelengths without increasing the light loss of the wavelength light multiplexed with the add wavelengths. Moreover, it is made possible to not only drop but also pass through the drop wavelengths simultaneously. Therefore, this is applicable to cases such as simultaneously transmitting large-volume data of high quality image or the like to multiple points.

[7] Also, the optical add/drop multiplexer according to the present invention may further comprise a branching portion branching a part of the lights of the drop wavelengths as the lights of through wavelengths; and a means selecting a part of the lights of the through wavelengths branched by the branching portion or the lights of the add wavelengths to be provided to the coupler.

Thus, it is made possible to not only drop but also pass though the drop wavelengths simultaneously. Also, it is made possible to freely select whether to circulate a part of the add wavelengths or to pass through a part of the drop wavelengths according to an intended purpose and a time zone, so that it is made possible to more flexibly accommodate to communication services that become diversified daily.

[8] Moreover, an optical add/drop multiplexer according to the present invention may comprise: a first optical circulator inputting and outputting WDM signal lights; a wavelength selective switch connected to the first optical circulator and comprising a first port inputting and outputting the WDM signal lights, a second port outputting lights of drop wavelengths branched from the WDM signal lights inputted from the first port, a third port inputting and outputting lights of add wavelengths inserted into the WDM signal lights, and a fourth port inputting and outputting lights of remaining through wavelengths after having deleted the drop wavelengths and the add wavelengths from the WDM signal lights; an optical reflector reflecting the lights of the through wavelengths outputted from the fourth port to be inputted to the fourth port; and a second optical circulator comprising a fifth port inputting and outputting the lights of the add wavelengths for the third port, a sixth port outputting the lights of the add wavelength outputted from the third port, and a seventh port inputting the lights of the add wavelengths externally inputted.

Namely, by connecting a wavelength selective switch to the first optical circulator which inputs and outputs the WDM signal light, this wavelength selective switch serves as the optical branching portion and optical inserting portion of the optical add/drop multiplexer.

In this case, the wavelength selective switch inputs and outputs the WDM signal lights through the first port (input/ output port) between the first optical circulator, outputs from the second port (drop port) the lights of the drop wavelengths branched from the WDM signal lights inputted from the first port, inputs and outputs from the third port (add port) lights of the add wavelengths to be inserted into the WDM signal lights, and inputs and outputs from the fourth port the lights of the remaining wavelengths after removing the drop wavelengths and the add wavelengths from the WDM signal lights.

Also, considering that the WDM signal lights cannot pass through directly from the first optical circulator, the lights of wavelengths outputted from the fourth port of the wavelength selective switch are reflected by the optical reflector to be again inputted to the fourth port.

Also, the second optical circulator connected to the third port of the wavelength selective switch inputs and outputs lights of the add wavelengths between the fifth port and the third port, outputs from the sixth port the lights of the add wavelengths outputted from the third port, and inputs from the seventh port the lights of the add wavelengths inputted from outside.

Also in this case, the add wavelengths are not included in the wavelengths inputted and outputted through the fourth port, so that it is made possible to avoid the multiple circulation of the add wavelength. Also, since the wavelengths inputted and outputted through the fourth port are merely reflected by the optical reflector, the light loss is small.

[9] In the optical add/drop multiplexer of the above-mentioned [8], the third port may also serve as the second port when the drop wavelengths and the add wavelengths are mutually same.

Namely, if the drop wavelengths and the add wavelengths are mutually the same, the add wavelengths outputted from the third port (add port), namely the drop wavelengths are outputted through the fifth port and sixth port of the second circulator, so that the third port (add port) also serves as the second port (drop port).

[10] In the optical add/drop multiplexer of the above-mentioned [8], an optical terminator may be connected to the sixth port of the second circulator when the drop wavelengths and the add wavelengths are mutually different.

Namely, if the drop wavelengths and the add wavelengths are different from each other, the add wavelengths outputted from the second port are outputted through the fifth port of the second circulator and from the sixth port and terminated by the optical terminator.

Therefore, it is made possible to avoid the multiple circulation of lights whose add wavelengths are different from the drop wavelengths.

[11] The optical add/drop multiplexer of the above-mentioned [8] may further comprise an optical transmissive reflector transmitting and simultaneously reflecting a part of the lights of the drop wavelengths outputted from the second port of the wavelength selective switch to be inputted to the second port.

Namely, by using an optical transmissive reflector such as a half mirror, when a part of lights of the drop wavelengths outputted from the second port of the wavelength selective switch are passed through as well as reflected and inputted to the second port, the lights of the reflected drop wavelengths are multiplexed into the lights of the through wavelengths, so that the WDM signal lights are outputted from the first port (input output port) of the wavelength selective switch through the first optical circulator.

Thus, it is made possible to not only drop but also pass through the drop wavelengths simultaneously, so that this is applicable to cases such as simultaneously transmitting high capacity data of high quality image or the like to multiple points.

[12] The above-mentioned wavelength selective switch may comprise a movable mirror and dispersive optical system. Namely, the wavelength selective switch may be composed of a general movable mirror such as a MEMS mirror and a dispersive optical system such as a diffraction grating.

[13] Also, the above-mentioned wavelength selective switch may comprise a 1×N wavelength multiplexer/demultiplexer, an N×N wavelength matrix switch, and an N×N wavelength multiplexer/demultiplexer. Namely, the same function as that of the above-mentioned wavelength selective switch composed of the movable mirror and the dispersive optical system can be realized by composing the wavelength selective switch with a 1×N wavelength multiplexer/demultiplexer, an N×N wavelength matrix switch, and an N×N wavelength multiplexer/demultiplexer.

[14] In order to achieve the above-mentioned object, an optical network system according to the present invention comprises: any one of the above-mentioned optical add/drop multiplexers.

According to an optical add/drop multiplexer of the present invention and an optical network system using the same, by using the wavelength selective switch, the add wavelengths can be excluded from the WDM signal lights, i.e. the lights of wavelengths to be multiplexed with the add wavelengths immediately before the add wavelengths are multiplexed. Therefore, it is made possible to avoid the multiple circulation of the add wavelengths without increasing the light loss of the wavelength light multiplexed with the add wavelengths.

Also, it is made possible in some cases to exclude the use of optical amplifiers and wavelength selective switches that cause a high increase of cost and size of the optical add/drop multiplexer. In this case, it is also made possible to avoid the increase of cost and size of the optical add/drop multiplexer.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Embodiments of the present invention will now be described referring to the attached figures.

Figure 1:
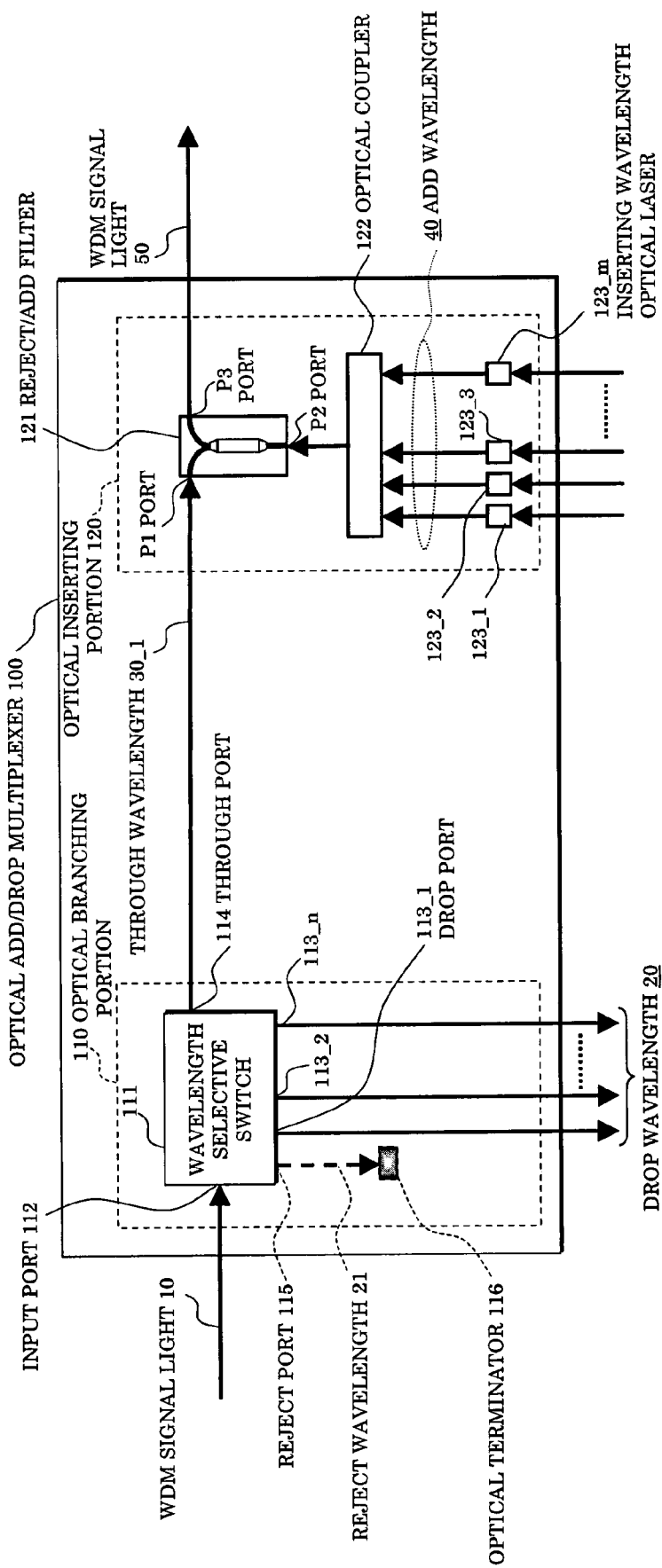
FIG. 1 is a block diagram showing an embodiment (1) of an optical add/drop multiplexer according to the present invention.

Embodiment (1) of Optical Add/Drop Multiplexer: FIG. 1

FIG. 1 shows an embodiment (1) of an optical add/drop multiplexer. An optical add/drop multiplexer 100 of FIG. 1 has an optical branching portion 110 and an optical inserting portion 120.

The optical branching portion 110 is composed of a wavelength selective switch 111 provided with an input port 112, drop ports 113_1-113_$_{13}$ n, and a through port 114. The optical inserting portion 120 is composed of a reject/add filter 121 having 3 ports P1-P3, an optical coupler 122, and inserting wavelength optical lasers 123_1-123_m.

For the wavelength selective switch 111, an already-known 1×N optical switch capable of separating arbitrary wavelengths from WDM signal lights inputted to be outputted to an arbitrary port as WDM signal lights can be used. It is to be noted that details on function and arrangement of a general wavelength selective switch will be described later.

In operation, when a WDM signal light 10 is inputted to the input port 112 of the wavelength selective switch 111 in the optical branching portion 110, the wavelengths multiplexed into the WDM signal light 10 are demultiplexed into drop wavelengths 20 and through wavelengths 30_1. The drop wavelengths 20 are respectively outputted from each of the drop ports 113_1-113_n per wavelength, and the through wavelengths 30_1 are outputted from the through port 114 as a WDM signal light without the drop wavelengths 20 and inputted to the port P1 of the reject/add filter 121 in the optical inserting portion 120.

On the other hand, add wavelengths 40 inputted to the optical inserting portion 120 are converted into predetermined wavelengths per wavelength by the inserting wavelength optical lasers 123_1-123_m, multiplexed by the optical coupler 122, and then inputted to the port P2 of the reject/add filter 121.

The reject/add filter 121 intercepts from the through wavelengths 30_1 inputted to the port P1 the wavelengths that are the same with the wavelengths inputted to the port P2, and multiplexes the add wavelengths 40 inputted to the port P2 with the through wavelengths 30_1 to be outputted as WDM signal lights 50 from the port P3.

When a wavelength different from the drop wavelengths 20 is included in the add wavelengths 40, a reject port 115 for multiplexing the wavelength that is different from the drop wavelengths 20 to be outputted as a reject wavelength 21 is provided in the wavelength selective switch 111, where an optical terminator 116 is connected to the reject port 115.

In this case, the through wavelengths 30_1 outputted from the through port 114 of the wavelength selective switch 111 do not include the reject wavelength 21.

Thus, the through wavelengths 30_1 include almost none of the wavelengths that are the same as the add wavelengths 40. While the interception loss with a single staged reject/add filter as shown in FIG. 1 is as low as about 23 dB, it is made possible to sufficiently avoid the multiple circulation of the add wavelength 40. Meanwhile, the transmission loss of the through wavelength 30_1 can be suppressed to about 0.5 dB.

A principle of a generally known wavelength selective switch will now be described referring to FIG. 2. A 1×N wavelength selective switch SW shown in FIG. 2 has an output port Pout composed of N ports P#1-P#N for a single input port Pin.

Figure 2:
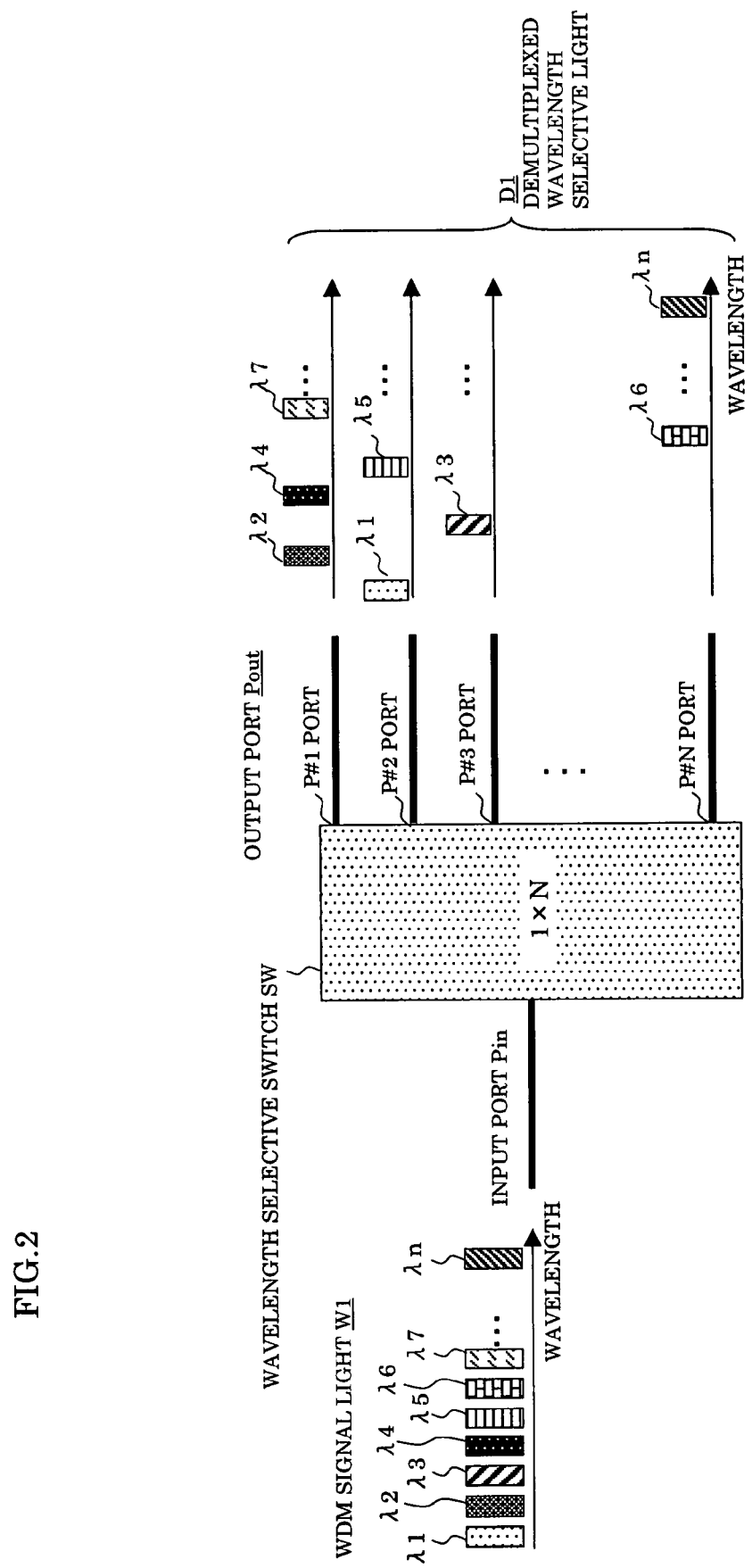
FIG. 2 is a diagram for illustrating a principle of a general wavelength selective switch.

In the example of FIG. 2, wavelengths λ1-λn are multiplexed into a WDM signal lights W1. Among the wavelengths λ1-λn, as shown, wavelengths λ2, λ4, and λ7 are outputted from the port P#1, wavelengths λ1 and λ5 are outputted from the port P#2, wavelength λ3 in outputted from the port P#3, and the wavelengths λ6 and λn are outputted from the port P#N.

Thus, the wavelength selective switch SW separates arbitrary wavelengths from the WDM signal light W1 inputted to the input port Pin, to be outputted from arbitrary ports P#1-P#N in the output port Pout as a WDM signal (separated and selected light D1) (ports P#1, P#2, and P#N in the example of FIG. 2). It is to be noted that a single wavelength only can be outputted from port P#3 as shown in FIG. 2.

Figure 3:
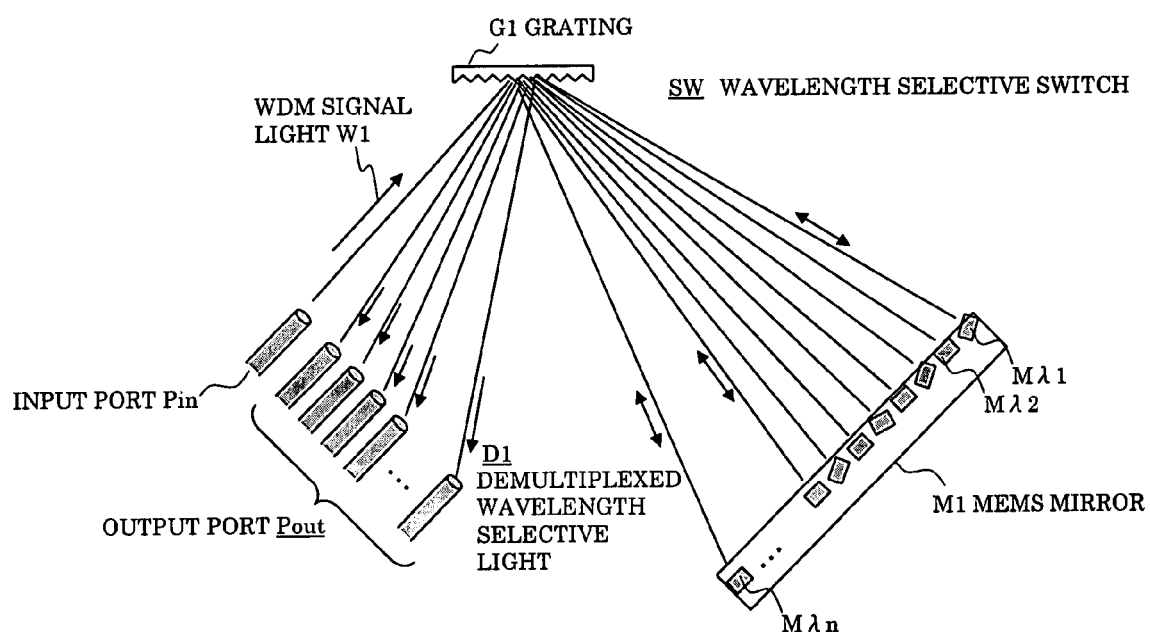
FIG. 3 is a diagram for illustrating an arrangement of a general wavelength selective switch.

The wavelength selective switch SW realizing such functions is generally arranged as shown in FIG. 3. Hereinafter, an arrangement of a general wavelength selective switch SW will be described referring to the attached figures.

The WDM signal light W1 inputted to the input port Pin is separated into individual wavelengths by a grating G1 and irradiated to a MEMS (Micro Electro Mechanical System) mirror M1 which is an example of a general movable mirror. While the lights reflected by the MEMS mirror M1 return to the grating G1, the MEMS mirror M1 is provided with movable mirrors Mλ1-Mλn corresponding to the individual wavelengths, so that by controlling the angles of the movable mirrors Mλ1-Mλn to change paths of reflected lights of the wavelengths, it is made possible to output the reflected lights of the wavelengths to an arbitrary output port Pout as a branched wavelength selected light D1.

It is to be noted that if a light injected into the MEMS mirror M1 is completely reflected in the opposite direction, the light returns to the input port Pin again from the grating G1.

The wavelength selective switch SW, different from the optical coupler, does not branch power, so that it has a feature that optical loss of the transmitted light is small. Also, it has a feature of having a reversibility such that when a light of the wavelength identical to that outputted from the output port Pout is reversely inputted thereto, the light returns to the input port Pin following the reverse path to the above-mentioned path.

Figure 4:
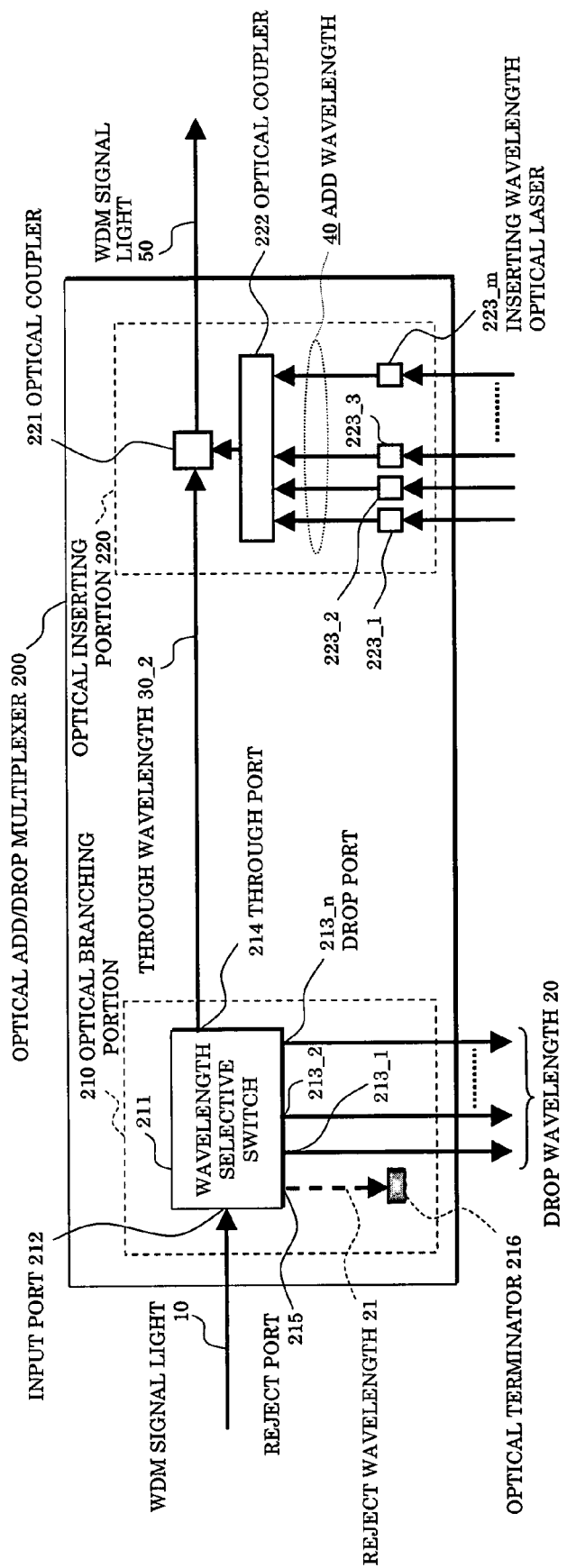
FIG. 4 is a block diagram showing an embodiment (2) of an optical add/drop multiplexer according to the present invention.

Embodiment (2) of Optical Add/Drop Multiplexer: FIG. 4

FIG. 4 shows an embodiment (2) of an optical add/drop multiplexer. An optical add/drop multiplexer 200 of FIG. 4 has an optical branching portion 210 and an optical inserting portion 220.

Namely, the optical branching portion 210 is composed of a wavelength selective switch 211 provided with an input port 212, drop ports 213_1-213_n, and a through port 214. The optical inserting portion 220 is composed of optical couplers 221 and 222, as well as inserting wavelength optical lasers 223_1-223_m.

Accordingly, while the optical add/drop multiplexer 200 of FIG. 4 has an arrangement similar to that of the optical add/drop multiplexer 100 shown in FIG. 1, it is different in that the optical add/drop multiplexer 200 uses the optical coupler 221 instead of the reject/add filter 121 of the optical inserting portion 120 in the optical add/drop multiplexer 100.

In operation, when a WDM signal light 10 is inputted to the input port 212 of the wavelength selective switch 211 in the optical branching portion 210, the wavelengths multiplexed in the WDM signal light 10 are demultiplexed into drop wavelengths 20 and through wavelengths 30_1. The drop wavelengths 20 are outputted from the drop ports 213_1-213_n per wavelength, and the through wavelengths 30_2 are outputted as a WDM signal light excluding therefrom the drop wavelength 20 from the through port 214 and inputted to the optical coupler 221 in the optical inserting portion 220.

On the other hand, add wavelengths 40 inputted to the optical inserting portion 220 are converted into predetermined wavelengths per wavelength by the inserting wavelength optical lasers 223_1-223_m, multiplexed by the optical coupler 122, and then inputted to the optical coupler 221.

The optical coupler 221 multiplexes the through wavelengths 30_2 with the multiplexed add wavelengths 40 inputted from the optical coupler 222 and outputs the WDM signal light 50.

In the same way as the above-mentioned embodiment (1), when a wavelength different from the drop wavelengths 20 is included in the add wavelengths 40, a reject port 215 for demultiplexing the wavelength that is different from the drop wavelengths 20 to be outputted as a reject wavelength 21 is provided in the wavelength selective switch 211, where an optical terminator 216 is connected to the reject port 215. Thus it is made possible to terminate the reject wavelength 21 on the side of the optical branching portion 210.

In this case, the reject wavelength 21 is not included in the through wavelengths 31_1 outputted from the through port 214 of the wavelength selective switch 211.

Thus, the through wavelengths 30_1 include almost none of the wavelengths that are the same as the add wavelengths 40. Therefore, even by substituting the optical coupler 221 for the single-staged reject/add filter 121 as shown in FIG. 1, it is made possible to avoid the multiple circulation of the add wavelengths 40.

Figure 5:
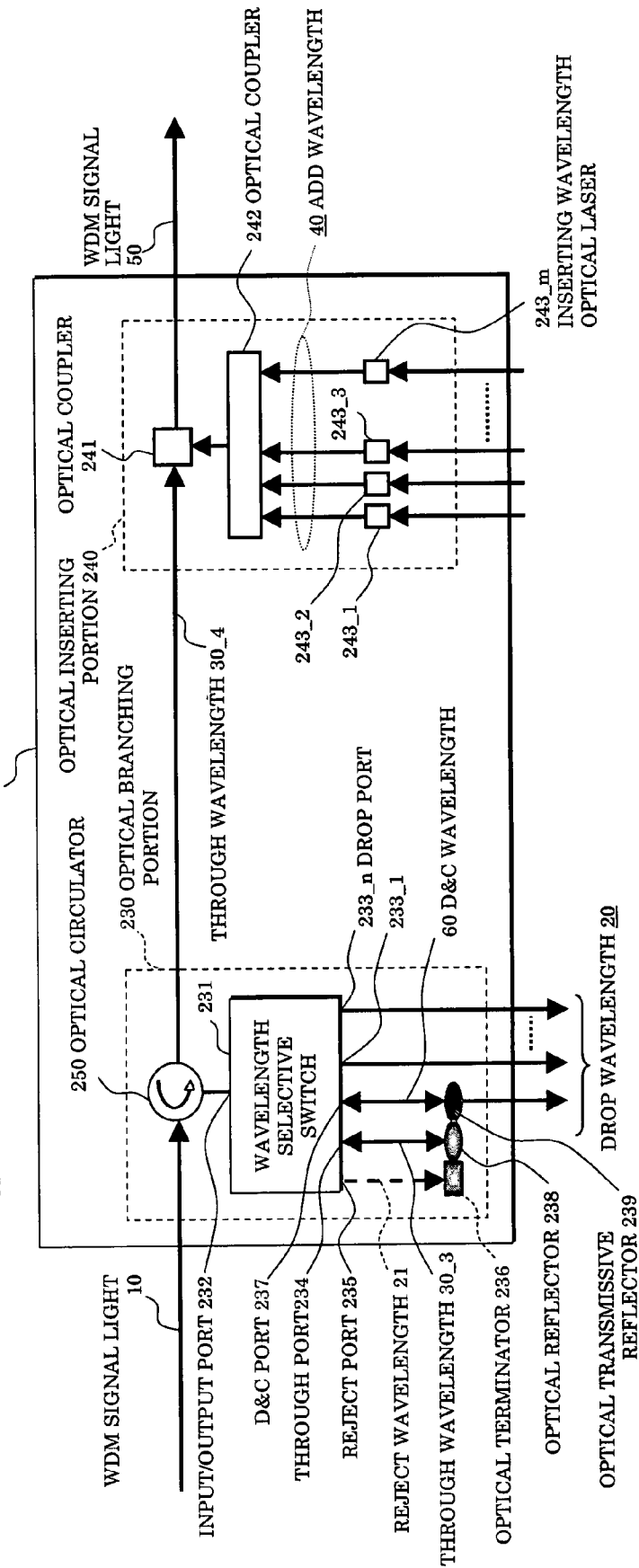
FIG. 5 is a block diagram showing an embodiment (3) of an optical add/drop multiplexer according to the present invention.

Embodiment (3) of Optical Add/Drop Multiplexer: FIG. 5

FIG. 5 shows an embodiment (3) of an optical add/drop multiplexer. An optical add/drop multiplexer 200A of FIG. 5 has an optical branching portion 230 and an optical inserting portion 240.

The optical branching portion 230 is composed of an optical circulator 250 and a wavelength selective switch 231. The wavelength selective switch 231 includes an input/output port 232, drop ports 233_1-233_n, a through port 234, and a drop and continue port (hereinafter, referred to as D&C port) 237. The optical inserting portion 240 is composed of optical couplers 241, 242, and inserting wavelength optical lasers 243_1-243_m.

In the optical branching portion 230, an optical reflector 238 is connected to the through port 234, and an optical transmissive reflector 239 is connected to the D&C port 237 as shown in FIG. 5. For the transmissive reflector 239, e.g. a half mirror can be used.

Thus, the optical add/drop multiplexer 200A shown in FIG. 5 is different from the above-mentioned embodiment (2) in that the optical branching portion 230 is composed of the optical circulator 250 and the wavelength selective switch 231, the optical reflector 238 is connected to the through port 234 of the wavelength selective switch 231 in the optical branching portion 230, and the optical transmissive reflector 239 is connected to the D&C port 237 provided in the wavelength selective switch 231 in the optical branching portion 230.

It is to be noted that while only a single set of combination of the D&C port 237 and the optical transmissive reflector 239 is shown in FIG. 5, a plurality of sets corresponding to the combination of the D&C port 237 and the optical transmissive reflector 239 can be adopted when it is desired that a plurality of wavelengths are dropped and continued (not only dropped but also passed though at the same time).

In operation, when the WDM signal light 10 is inputted to the input/output port 232 of the wavelength selective switch 231 through the optical circulator 250, the wavelengths multiplexed into the WDM signal light 10 are demultiplexed into the drop wavelengths 20, the reject wavelength 21, and the through wavelengths $30_13$. It is to be noted that a drop and continue wavelength (hereinafter, referred to as D&C wavelength) 60 is included in the drop wavelengths 20.

Among these wavelengths, the drop wavelengths 20 are outputted from the drop ports 233_1-233_n per wavelength, the D&C wavelength 60 is outputted specifically from the D&C port 237. A part of the D&C wavelength 60 is outputted unchanged as the drop wavelength 20, while the D&C wavelength 60 having been reflected by the optical transmissive reflector 239 is re-inputted to the wavelength selective switch 231 from the D&C port in the same way as the through wavelengths 30_3.

The through wavelengths 30_3 are outputted as the WDM signal light without the drop wavelengths 20 and the add wavelengths 40 from the through port 234, reflected by the optical reflector 238, and re-inputted to the wavelength selective switch 231 from the through port 234.

The through wavelengths 30_3 and the D&C wavelengths 60 respectively inputted from the through port 234 and the D&C port 237 are multiplexed, and outputted as the through wavelengths 30_4 from the input/output port 232 through the optical circulator 250.

On the other hand, the add wavelengths 40 inputted to the optical inserting portion 240 are converted into predetermined wavelengths by the inserting wavelength optical lasers 243_2-243m, and then multiplexed by the optical coupler 242 and inputted to the optical coupler 241.

The optical coupler 241 multiplexes the through wavelengths 30_1 and the multiplexed add wavelengths 40 inputted from the optical coupler 242 to be outputted as the WDM signal light 50. It is to be noted that in this embodiment, the same wavelengths as the D&C wavelengths 60 are not included in the add wavelengths 40.

Also in this embodiment, when a wavelength different from the drop wavelengths 20 is included in the add wavelengths 40, a reject port 235 for demultiplexing the wavelength that is different from the drop wavelengths 20 to be outputted as the reject wavelength 21 is provided in the wavelength selective switch 231, where an optical terminator 236 is connected to the reject port 235. Thus, it is made possible to terminate the reject wavelength 21 on the side of the optical branching portion 230. In this case, the reject wavelength 21 is not included in the through wavelengths 30_4 outputted from the wavelength selective switch 231 through the optical circulator 250.

Figure 6:
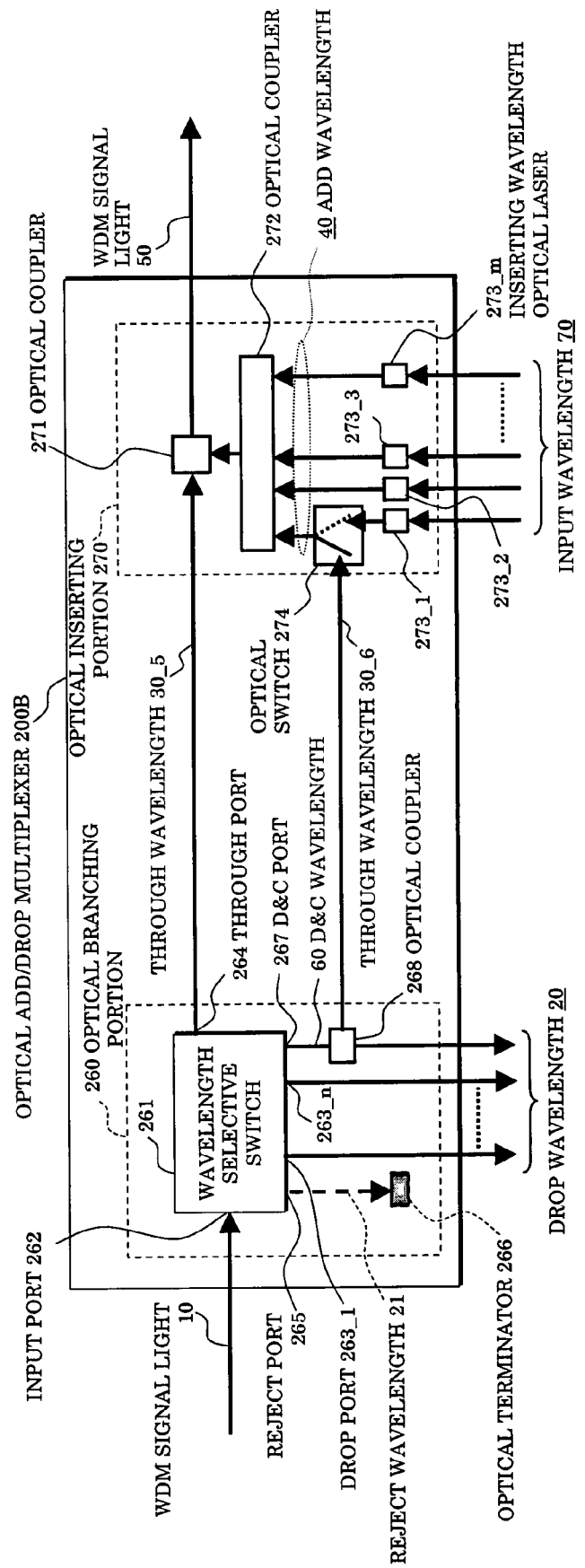
FIG. 6 is a block diagram showing an embodiment (4) of an optical add/drop multiplexer according to the present invention.

Embodiment (4) of Optical Add/Drop Multiplexer:
FIG. 6

FIG. 6 shows an embodiment (4) of an optical add/drop multiplexer. An optical add/drop multiplexer 200BA of FIG. 6 has an optical branching portion 260 and an optical inserting portion 270.

The optical branching portion 260 is composed of a wavelength selective switch 261 provided with an input port 262, drop ports 263_1-263_n, a through port 264, and a drop and continue port (hereinafter, referred to as D&C port), as well as an optical coupler 268 connected to the D&C port 267.

On the other hand, the optical inserting portion 270 is composed of optical couplers 271 and 272, inserting wavelength optical lasers 273_1-273_m, and an optical switch 274.

Accordingly, while the optical add/drop multiplexer 200B of FIG. 6 has an arrangement similar to that of the optical add/drop multiplexer 200 of FIG. 2, it is different in that the D&C port 267 is provided to the wavelength selective switch 261 and the optical coupler 268 is connected thereto, and the optical switch 274 is provided between the inserting wavelength optical laser 273_1 and the optical couplers 268 and 272.

It is to be noted that while only a single set of combination of the D&C port 267, the optical coupler 268, and the inserting wavelength optical laser 273_1 is shown in FIG. 6, a plurality of sets corresponding thereto per wavelength can be adopted when it is desired that a plurality of wavelengths are dropped and continued.

In operation, when the WDM signal light 10 is inputted to the input/output port 262 of the wavelength selective switch 261 in the optical branching portion 260, the wavelengths multiplexed into the WDM signal light 10 are demultiplexed into the drop wavelengths 20, the reject wavelength 21, and the through wavelengths 30_5. It is to be noted that a drop and continue wavelength 60 is included in the drop wavelengths 20.

Among these wavelengths, the drop wavelengths 20 are outputted from the drop ports 263_1-263_n per wavelength, the D&C wavelength 60 is outputted specifically from the D&C port 267. A part of the D&C wavelength 60 is outputted unchanged as the drop wavelength 20, while the D&C wavelength 60 having been branched by the coupler 268 is inputted to the optical switch 274 of the optical inserting portion 270 as reflected by the optical transmissive reflector 239 is re-inputted to the wavelength selective switch 231 from the D&C port in the same way as the through wavelengths 30_3.

The through wavelengths 30_5 are outputted as the WDM signal light without the drop wavelengths 20 and the reject wavelength 21 from the through port 264 and inputted to the optical coupler 271 of the optical inserting portion 270.

On the other hand, the input wavelengths 70 inputted to the optical inserting portion 270 are converted into predetermined wavelengths by the inserting wavelength optical lasers 273_2-273m. Among these wavelengths, the light of the wavelengths converted into predetermined wavelengths by the inserting wavelength optical lasers 273_1-273_m are multiplexed as the add wavelengths 40 by the optical coupler 272 to be inputted to the optical coupler 271.

As for the light of the wavelength converted by the inserting wavelength optical laser 273_1, the optical switch 274 selects either one of the wavelength light inputted by the inserting wavelength optical laser 273_1 and the through wavelength 30_6 inputted from the optical coupler 268 of the optical branching portion 280, and provides as the add wavelength 40 to the optical coupler 272.

The optical coupler 271 multiplexes the through wavelengths 30_5 and the add wavelengths 40 multiplexed and inputted from the optical coupler 272, and outputs the WDM signal light 50.

It is to be noted that as the optical switch 274, a known 2×1 switch capable of switching over the input according to the usage or time zone, for example may be used.

Also, while in this embodiment, either one of the wavelength light inputted by the inserting wavelength optical laser 273_1 and the through wavelength 30_6 inputted from the optical coupler 268 of the optical branching portion 280 is selected by using the optical switch 274, the through wavelength 30_6 may be made to be provided directly to the optical coupler 272 from the optical coupler 268 of the optical branching portion 260.

Also in this embodiment, when a wavelength different from the drop wavelengths 20 is included in the add wavelengths 40, a reject port 265 for demultiplexing from the WDM signal light 10 the wavelength that is different from the drop wavelengths 20 to be outputted as the reject wavelength 21 is provided in the wavelength selective switch 261, where an optical terminator 266 is connected to the reject port 265. In this case, the through wavelengths 30_5 outputted from the through port 264 of the wavelength selective switch 261 do not include the reject wavelength 21.

Figure 7:
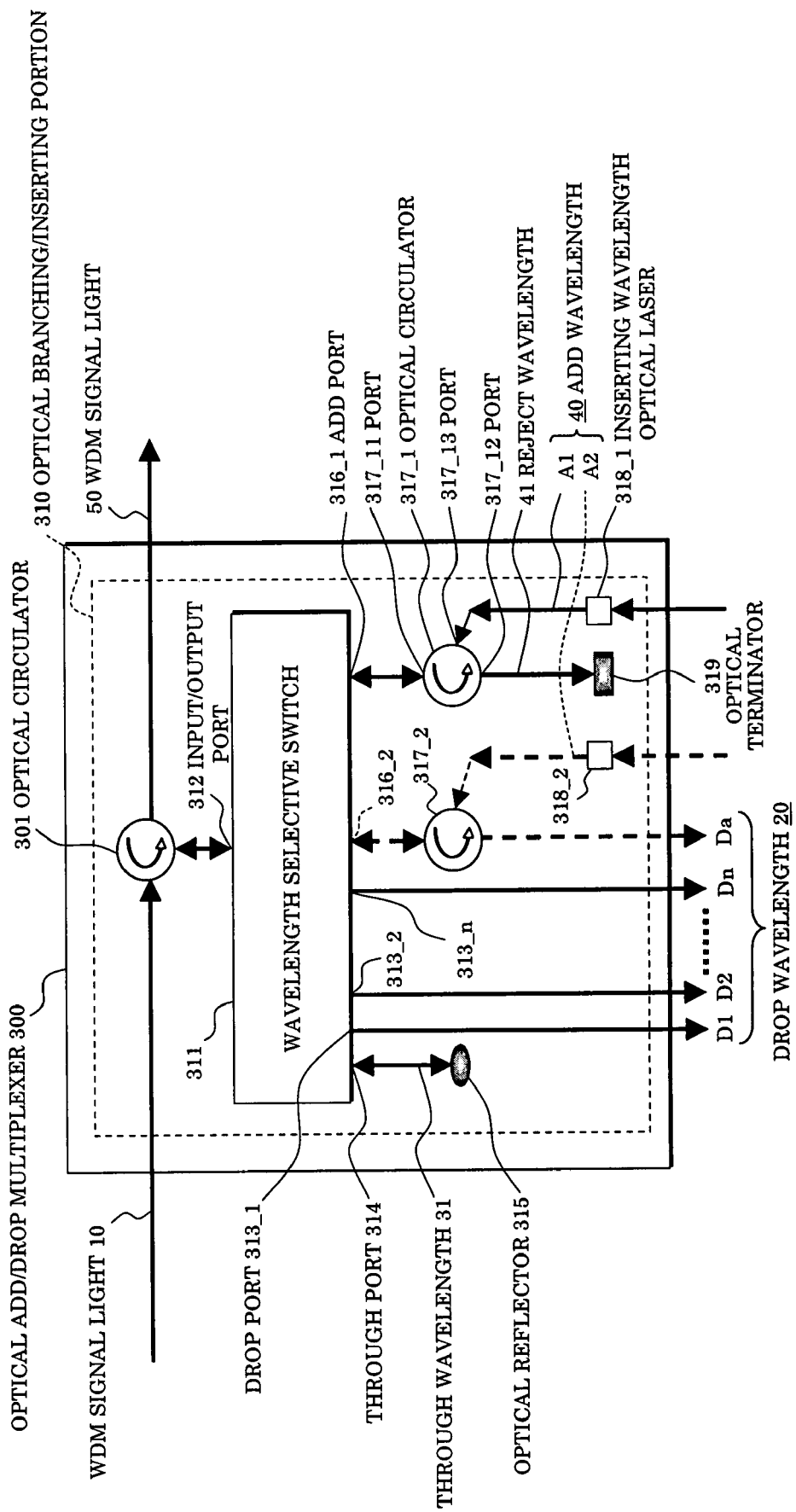
FIG. 7 is a block diagram showing an embodiment (5) of an optical add/drop multiplexer according to the present invention.

Embodiment (5) of Optical Add/Drop Multiplexer:
FIG. 7

FIG. 7 shows an embodiment (5) of an optical add/drop multiplexer. An optical add/drop multiplexer 300 of FIG. 7 is different from the optical add/drop multiplexers 100, 200, 200A, and 200B of the above-mentioned embodiments (1)-(4) in that an optical branching/inserting portion 310 in which an optical branching portion and an optical inserting portion are integrated is provided.

The optical branching/inserting portion 310 is composed of an optical circulator 301 and a wavelength selective switch 311. The wavelength selective switch 311 includes an input/output port 312, drop ports 313_1-313_n, a through port 314, and an add port 316_1. Among these ports, an optical reflector 315 is connected to the through port 314, and an optical circulator 317_1 and an optical terminator 319 are connected in cascade to the add port 316_1 as shown in FIG. 7.

In operation, when the WDM signal light 10 is inputted to the input/output port 312 of the wavelength selective switch 311 in the optical branching/inserting portion 310 through the optical circulator 301, the wavelengths multiplexed in the WDM signal light 10 are demultiplexed into the drop wavelengths 20, the through wavelength 31, and the add wavelengths 40.

Among these wavelengths, the drop wavelengths 20 are outputted from the drop ports 313_1-313_n per wavelength. Also, the through wavelength 31 is outputted from the through port 314 as a WDM signal light excluding therefrom the drop wavelengths 20 and the add wavelengths 40 to be reflected by the optical reflector 315 and re-inputted to the wavelength selective switch 311 through the through port 314. Moreover, the add wavelength, which has been included in the WDM signal light 10, is outputted from the add port 316_1 as the reject wavelength 41 to be terminated by the optical terminator 319 through ports 317_12 and 317_11 of the optical circulator 317_1.

On the other hand, the add wavelengths 40 inputted to the optical branching/inserting portion 310 are converted into predetermined wavelengths by an inserting wavelength optical laser 318_1, as shown in FIG. 7 with respect to a wavelength A1, and then inputted to the wavelength selective switch 311 from the add port 316_1 through ports 317_13 and 317_11 of the optical circulator 317_1.

It is to be noted that the combination of the add port 316_1, the optical circulator 317_1, and the optical terminator 319 in FIG. 7 is on the assumption that the wavelength A1 which is different from the drop wavelengths 20 (wavelengths D1-Dn) is inserted as the add wavelength, so that only one set is shown in FIG. 7. However, in case the wavelength of the add wavelengths 40 is not only the wavelength A1 but a plurality of wavelengths exist, a plurality of combinations corresponding to that of the add port 316_1, the optical circulator 317_1, and the optical terminator 319 have only to be adopted.

Also, in case where e.g. the wavelengths Da and A2 shown in FIG. 7 among the drop wavelengths 20 and the add wavelengths 40 are the same wavelength, an add port 316_2 having an optical circulator 317_2 connected thereto for the wavelength A2 have only to be provided and share this add port 316_2 as the drop port of the wavelength Da.

This arrangement utilizes a reversibility of the wavelength selective switch 311, so that the through wavelength 31 and the add wavelengths 40 respectively inputted to the wavelength selective switch 311 from the through port 314 and the add port 316_1 (and 316_2) are multiplexed and outputted from the input/output port 312 as the WDM signal light 50 through the optical circulator 301.

Figure 8:
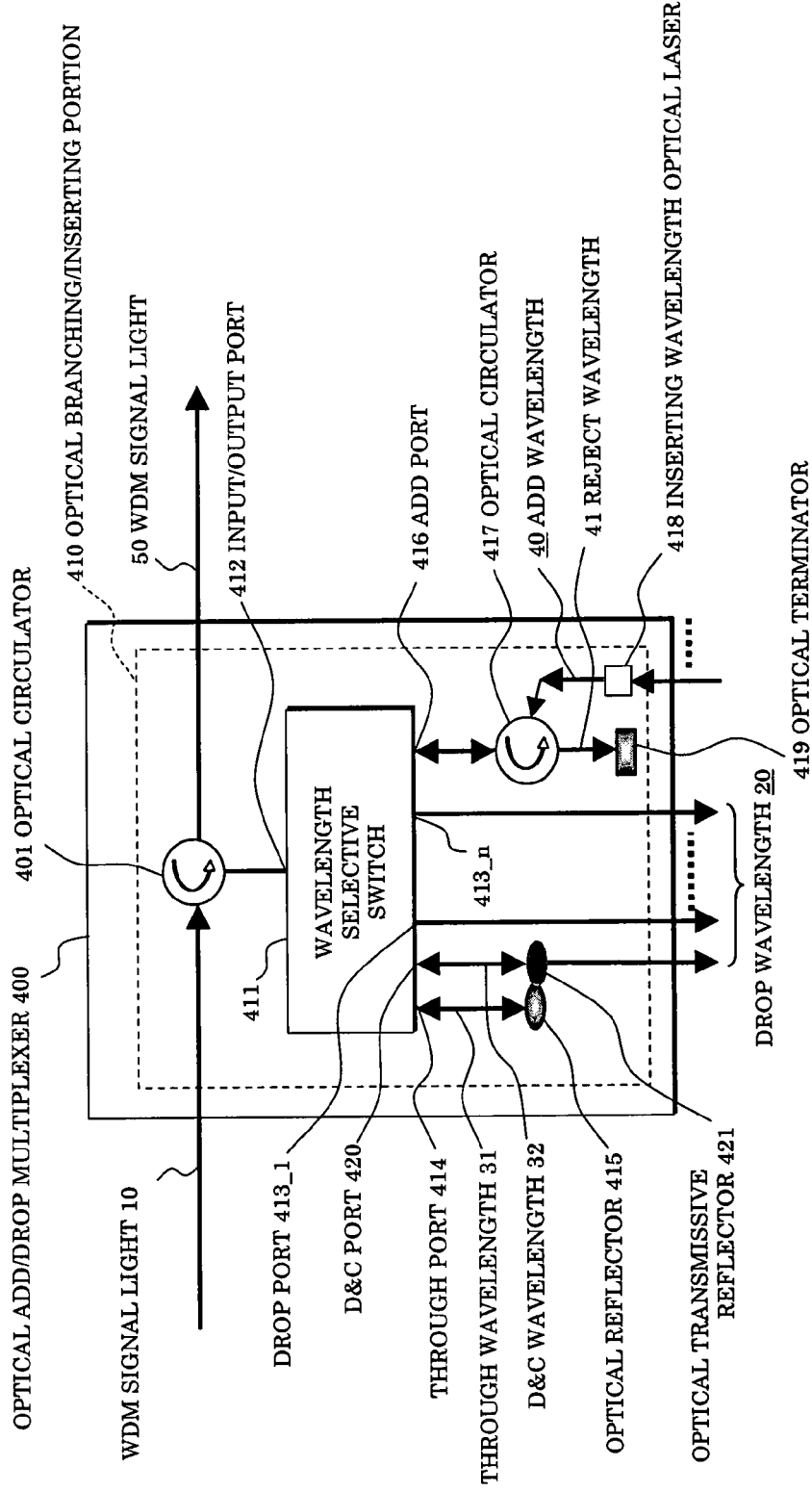
FIG. 8 is a block diagram showing an embodiment (6) of an optical add/drop multiplexer according to the present invention.

Embodiment (6) of Optical Add/Drop Multiplexer: FIG. 8

FIG. 8 shows an embodiment (6) of an optical add/drop multiplexer. While an optical add/drop multiplexer 400 of FIG. 8 has an arrangement similar to that of the above-mentioned optical add/drop multiplexer 300 in the embodiment (5), it is different in that a drop and continue port (hereinafter, referred to as D&C port) 420 is provided in a wavelength selective switch 411 to which an optical transmissive reflector 421 is connected.

Namely, an optical branching/inserting portion 410 of the optical add/drop multiplexer 400 is composed of an optical circulator 401 and a wavelength selective switch 411. The wavelength selective switch 411 includes an input/output port 412, drop ports 413_1-413_n, a through port 414, an add port 416, and a D&C port 420.

Among these ports, an optical reflector 415 is connected to the through port 414, and an optical circulator 417 and an optical terminator 419 are connected in cascade to the add port 416 as shown in FIG. 8. Also, an optical transmissive reflector 421 is connected to the D&C port 420. For the optical transmissive reflector 421, e.g. a half mirror may be used.

It is to be noted that while the component corresponding to the add port 316_2 and the optical circulator 317_2 shown in FIG. 7 is omitted in FIG. 8, a similar component may be included. Also, in the same way as in the embodiment (5), a plurality of combinations of the add port 416, the optical circulator 417, and the optical terminator 419 may be adopted per wavelength.

In operation, when the WDM signal light 10 is inputted to the input/output port 412 of the wavelength selective switch 411 in the optical branching/inserting portion 410 through the optical circulator 401, the wavelengths multiplexed in the WDM signal light 10 are demultiplexed into the drop wavelengths 20, the through wavelength 31, and the add wavelengths 40. However, it is supposed that a drop and continue wavelength (hereinafter, abbreviated as D&C wavelength) 32 is included in the drop wavelengths 20.

Among these wavelengths, the drop wavelengths 20 are outputted from the drop ports 413_1-413_n per wavelength.

Specifically, the D&C wavelength 32 is outputted from the D&C port 420. A part of the D&C wavelength 32 is outputted unchanged as the drop wavelengths 20, while the D&C wavelength 32 reflected by the transmissive reflector 421 is re-inputted to the wavelength selective switch 411 from the D&C port 420 in the same way as the through wavelength 31.

Also, the through wavelength 31 is outputted from the through port 414 as a WDM signal light excluding therefrom the drop wavelengths 20 and the add wavelengths 40 to be reflected by the optical reflector 415 and re-inputted to the wavelength selective switch 411 through the through port 414. Moreover, the add wavelengths, which have been included in the WDM signal light 10, are outputted from the add port 416 as the reject wavelengths 41 to be terminated by the optical terminator 419 through the optical circulator 417.

On the other hand, the add wavelengths 40 inputted to the optical branching/inserting portion 410 are converted into predetermined wavelengths by an inserting wavelength optical laser 418, and then inputted to the wavelength selective switch 411 from the add port 416 through the optical circulator 417.

The through wavelength 31, the D&C wavelength 32, and the add wavelengths 40 inputted to the wavelength selective switch 411 from the through port 414, the D&C port 420, and the add port 416 are multiplexed and outputted from the input/output port 412 as the WDM signal light 50 through the optical circulator 401.

Figure 9:
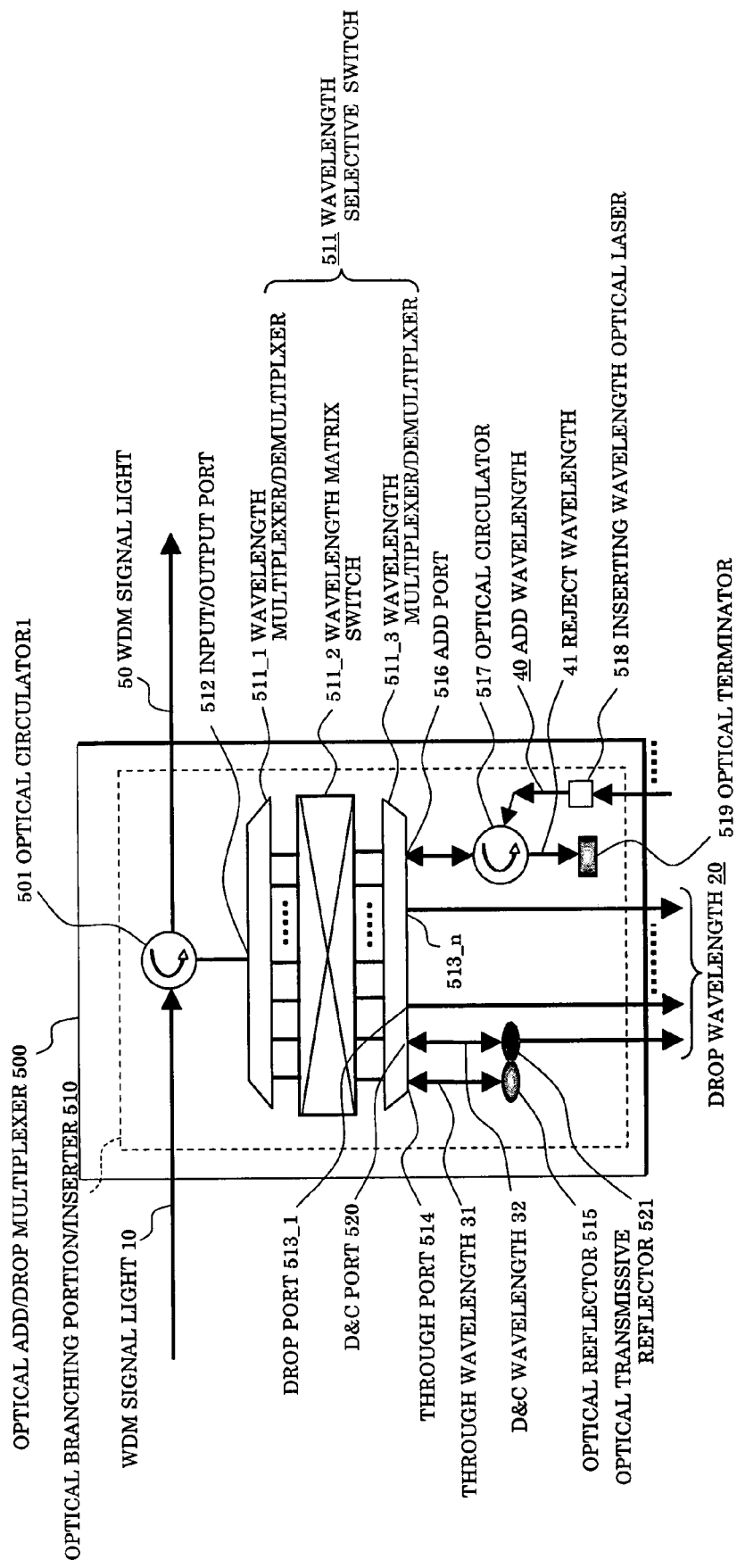
FIG. 9 is a block diagram showing an embodiment (7) of an optical add/drop multiplexer according to the present invention.

Embodiment (7) of Optical Add/Drop Multiplexer: FIG. 9

FIG. 9 shows an embodiment (7) of an optical add/drop multiplexer. While an optical add/drop multiplexer 500 of FIG. 9 has an arrangement similar to that of the above-mentioned optical add/drop multiplexer 400 in the embodiment (6), it is different in that a wavelength selective switch 511 having an arrangement that a 1×N wavelength division multiplexer 511_1 and an N×N wavelength division multiplexer 511_3 sandwich an N×N wavelength matrix switch 511_2 is substituted for the wavelength selective switch 411.

Namely, an optical branching/inserting portion 510 of the optical add/drop multiplexer 500 is composed of an optical circulator 501 and a wavelength selective switch 511. The wavelength selective switch 511 includes an input/output port 512, drop ports 513_1-513_n, a through port 514, an add port 516, and a D&C port 520.

Among these ports, an optical reflector 515 is connected to the through port 514, and an optical circulator 517 and an optical terminator 519 are connected in cascade to the add port 516 as shown in FIG. 9. Also, an optical transmissive reflector 521 is connected to the D&C port 520.

It is to be noted that the wavelength selective switch 511 may be similar to the above-mentioned embodiment (5) in that the D&C port 520 is not provided.

Also, the arrangement of the wavelength selective switch 511 shown in FIG. 9 may be applied to the wavelength selective switches 111, 211, 231, 261, 311, and 411 respectively in the above-mentioned embodiments (1)-(6).

Figure 10:
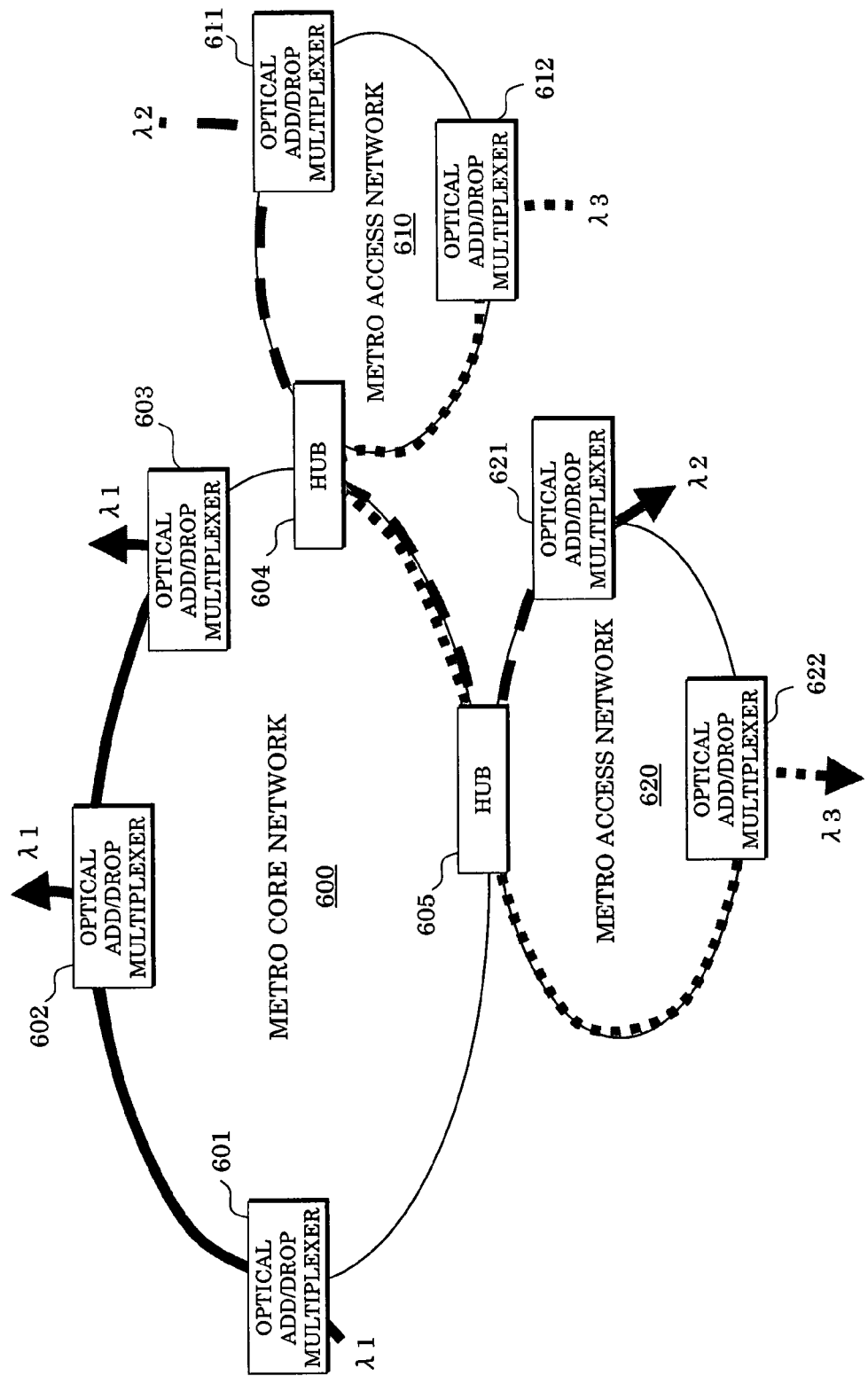
FIG. 10 is a block diagram showing an embodiment (1) of an optical network system according to the present invention.
Figure 11:
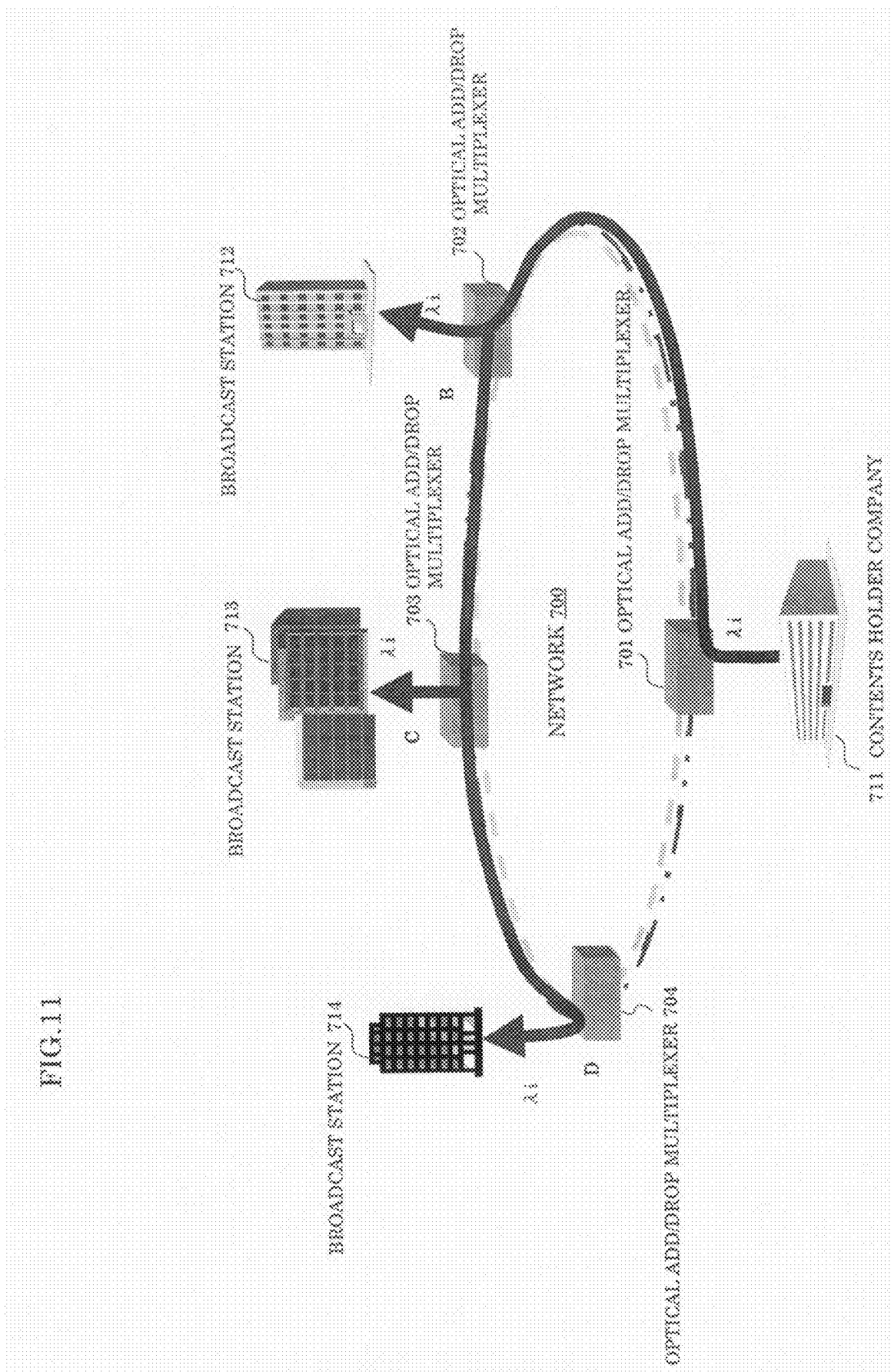
FIG. 11 is a block diagram showing an embodiment (2) of an optical network system according to the present invention.
Figure 12:
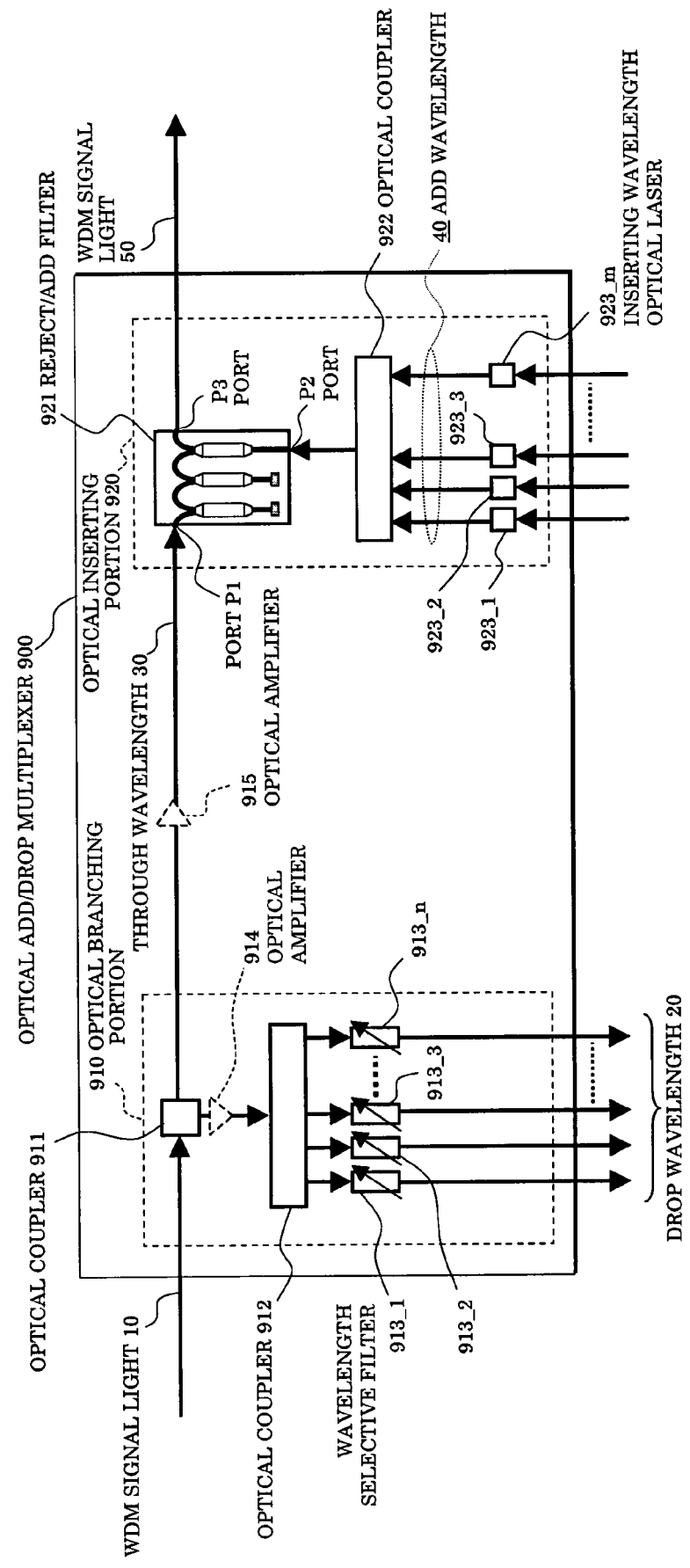
FIG. 12 is block diagram showing an arrangement of a prior art optical add/drop multiplexer.
Figure 13B:
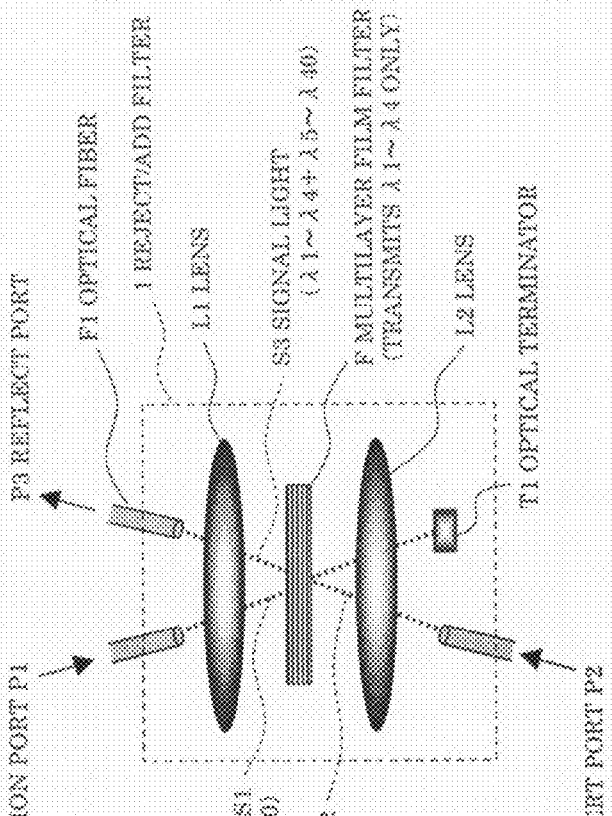
FIGS. 13A and 13B are diagrams for illustrating a general reject/add filter.
Figure 13A:
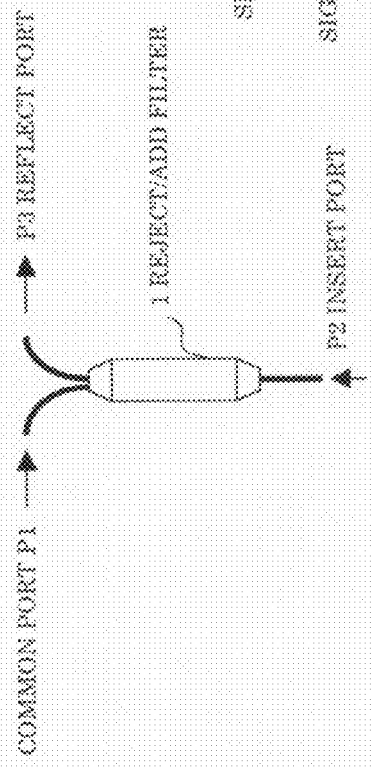
Figure 14B:
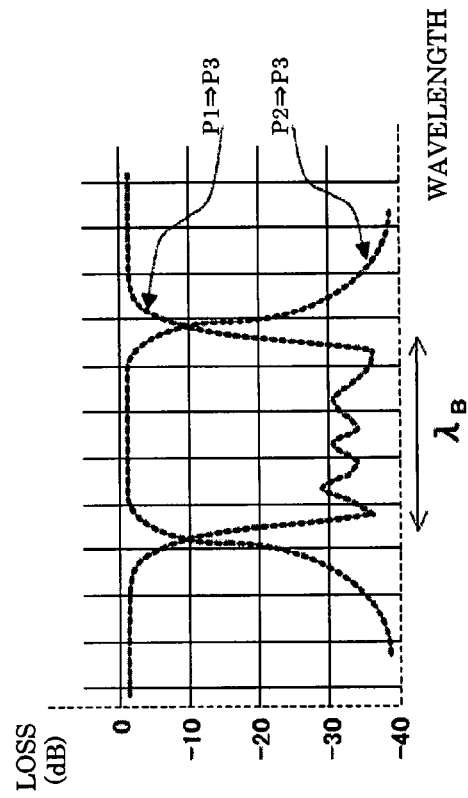
FIGS. 14A and 14B are diagrams for illustrating a three-staged reject/add filter.
Figure 14A:
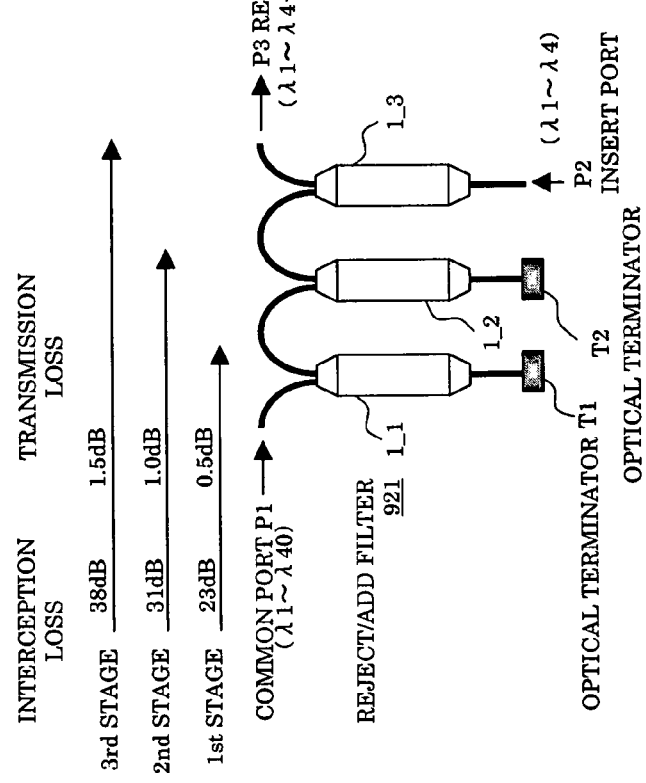

Network Examples where the Present Invention is Applied: FIGS. 10 and 11

Examples of optical network systems where the above-mentioned embodiments (1)-(7) are applied will now be described.

FIG. 10 is an example of an urban network where a metro core network 600 is connected to metro access networks 610 and 620 respectively through hubs 604 and 605.

Among the networks, any one of the optical add/drop multiplexers of the above-mentioned embodiments (1)-(7) is applied to optical add/drop multiplexers 601-603 composing the metro core network 600, optical add/drop multiplexers 611, 612 composing the metro access network 610, and optical add/drop multiplexers 621, 622 composing the metro access network 620.

Thus, in the metro core network 600, for example, a wavelength λ1 added at the optical add/drop multiplexer 601 can be dropped at the optical add/drop multiplexer 602 or 603. Also, wavelengths λ2 and λ3 respectively added at the optical add/drop multiplexers 611 and 612 of the metro access network 610 can be dropped at the optical add/drop multiplexer 621 or 622 of the metro access network 620 through the hubs 604 and 605 of the metro core network 600.

FIG. 11 is an example of a network transmitting the same data to multiple points. A network 700 has optical add/drop multiplexers 701-704 connected like a ring. A contents holder company 711 and broadcast stations 712-714 are connected to the optical add/drop multiplexers 701-704, respectively.

Among the optical add/drop multiplexers, any one of the above-mentioned embodiments (1)-(7) is applied to the optical add/drop multiplexers 701 and 704, while any one of the above-mentioned embodiments (3)-(7) is applied to the optical add/drop multiplexers 702 and 703.

The contents holder company 711 adds a wavelength λi, for example, at the optical add/drop multiplexer 701. The optical add/drop multiplexers 702 and 703 drop and concurrently pass through the wavelength λi at the respective D&C ports. The optical add/drop multiplexer 704 drops the wavelength λi.

Thus, each of the broadcast stations 712-714 can receive the same data with the wavelength λi. Accordingly, the network 700 enables a simultaneous transmission of large capacity data such as high quality images to multiple points.

What is claimed is:

1. An optical add/drop multiplexer, comprising:
an optical circulator inputting and outputting WDM signal lights;
a wavelength selective switch dropping lights of drop wavelengths from output lights from one side of the optical circulator and reflecting other lights than the dropped lights with a reflector to be outputted as lights through another side of the optical circulator;
an optical transmissive reflector transmitting and simultaneously reflecting a part of the lights of the drop wavelengths to be outputted through the wavelength selective switch from the optical circulator; and
a multiplexer multiplexing output lights from the wavelength selective switch outputted through the optical circulator and lights of add wavelengths to be outputted;
wherein the drop wavelengths other than the lights reflected by the optical transmissive reflector include all of the add wavelengths.

2. An optical network system, comprising:
optical add/drop multiplexers as claimed in claim 1.

3. An optical add/drop multiplexer, comprising:
an optical circulator inputting and outputting WDM signal lights;
a wavelength selective switch dropping lights of drop wavelengths and reject wavelengths from output lights from one side of the optical circulator, and reflecting other lights than the dropped lights with a reflector to be outputted as lights through another side of the optical circulator;
an optical transmissive reflector transmitting and simultaneously reflecting a part of the lights of the drop wavelengths to be outputted through the wavelength selective switch from the optical circulator; and
a multiplexer multiplexing output lights from the wavelength selective switch outputted through the optical circulator and lights of add wavelengths to be outputted;
wherein a combination of the drop wavelengths other than the lights reflected by the optical transmissive reflector and the reject wavelengths includes all of the add wavelengths.

4. An optical add/drop multiplexer, comprising:
a first optical circulator inputting and outputting WDM signal lights;
a wavelength selective switch connected to the first optical circulator and comprising a first port inputting and outputting the WDM signal lights, a second port outputting lights of drop wavelengths branched from the WDM signal lights inputted from the first port, a third port inputting and outputting lights of add wavelengths inserted into the WDM signal lights, and a fourth port inputting and outputting lights of remaining through wavelengths after having deleted the drop wavelengths and the add wavelengths from the WDM signal lights;
an optical reflector reflecting the lights of the through wavelengths outputted from the fourth port to be inputted to the fourth port; and
a second optical circulator comprising a fifth port inputting and outputting the lights of the add wavelengths for the third port, a sixth port outputting the lights of the add wavelength outputted from the third port, and a seventh port inputting the lights of the add wavelengths externally inputted.

5. The optical add/drop multiplexer as claimed in claim 4, wherein the third port also serves as the second port when the drop wavelengths and the add wavelengths are the same.

6. The optical add/drop multiplexer as claimed in claim 4, wherein an optical terminator is connected to the sixth port of the second circulator when the drop wavelengths and the add wavelengths are different.

7. The optical add/drop multiplexer as claimed in claim 4, further comprising an optical transmissive reflector transmitting and simultaneously reflecting a part of the lights of the drop wavelengths outputted from the second port of the wavelength selective switch to be inputted to the second port.

8. An optical network system, comprising:
optical add/drop multiplexers as claimed in claim 4.

* * * * *